3,546,171
SCHIFF-BASES OF PYRIDOXAL AND HIGH MOLECULAR POLYMERS AND THE PREPARATION THEREOF
Yasuo Fujimoto and Masao Tanaka, Machida-shi, Tokyo-to, Japan, assignors to Kyowa Hakko Kogyo Kabushiki Kaisha (Kyowa Hakko Kogyo Company Limited), Tokyo-to, Japan, a body corporate of Japan
No Drawing. Filed June 2, 1967, Ser. No. 643,037
Claims priority, application Japan, June 2, 1966, 41/35,087
Int. Cl. C07c 95/04; C08b 15/06, 25/00; C08g 13/00
U.S. Cl. 260—51                    14 Claims

ABSTRACT OF THE DISCLOSURE

The present invention relates to a process for preparing Schiff-bases composed of pyridoxal and high molecular polymers which are produced by the reaction of pyridoxal with a high molecular weight polymer containing at least one amino group.

BACKGROUND OF THE INVENTION AND DESCRIPTION OF THE PRIOR ART

It is well known to obtain Schiff-bases of pyridoxal, for example, by condensing aniline, benzylamine, phenylethylamine, isobutylamine, aminophenol, anisidine, toluidine or chloraniline with pyridoxal (J. Am. Chem. Soc., vol. 70, 3669 (1948); vol. 76, 5589 (1954). However, in these known processes, Schiff-bases are generally prepared by the reaction of an amine with pyridoxal in a suitable solution to obtain the Schiff-base, which is then precipitated therein. As a result, there is necessary hazardous and rather complex operations for the recovery of the unreacted pyridoxal or the amine from the reaction mixture. In addition, it is necessary to separate the amine from the hydrolyzed solution by a solvent extraction method when these processes are directed to the purification of pyridoxal, wherein the pyridoxal of high purity is obtained by the hydrolysis of the Schiff-base with a suitable acid or alkali.

GENERAL DESCRIPTION OF THE INVENTION

For the purpose of overcoming these disadvantages, applicants have discovered that pyridoxal can advantageously be combined with high molecular weight polymers to form Schiff-bases by treating a pyridoxal-containing solution with a substantially water-insoluble high molecular polymer having at least one amino group. Since the resulting novel Schiff-bases of pyridoxal and high molecular polymers are substantially insoluble in water, it is possible to separate the high molecular weight polymer simply by filtering the reaction solution. The pyridoxal remaining in the filtrate advantageously can be converted into the Schiff-base of pyridoxal and high molecular polymer by treatment according to the present process. It is also possible to easily regenerate the highly pure pyridoxal by hydrolysing the obtained Schiff-base with an acid or alkali aqueous solution and then filtering the solid high molecular polymer. The resulting Schiff-base can be used as an aldehyde group-protecting intermediate useful for the synthesis of various pyridoxal derivatives.

According to the invention, therefore, there is provided Schiff-bases which are the reaction products of pyridoxal and substantially water-insoluble high molecular polymers containing primary amino groups.

According to a further feature of the invention, there is provided a process for the preparation of Schiff-bases of pyridoxal and substantially water-insoluble high molecular weight polymers containing amino groups which comprises reacting pyridoxal in solution with a substantially water-insoluble high molecular polymer containing primary amino groups.

In the process of the present invention, not only can highly purified pyridoxal be used, but also various solutions containing pyridoxal such as those which are obtained by the oxidation of pyridoxine-containing solutions according to the known methods or for example, by the culture of microorganisms.

The reaction according to the present invention can be exemplified as follows:

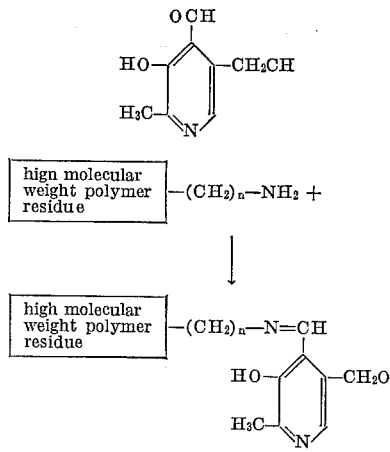

(wherein $n$ is zero or an integer of from 1 to 100).

As shown in the reaction as illustrated above, the reactive group is a primary amino group. The high molecular polymer may be soluble in organic solvents even though it is substantially insoluble in water. Therefore, high molecular weight polymers varying widely as far as their polymerization degree and chemical composition are concerned can be used. These high molecular weight polymers can be exemplified as follows: synthetic resins including phenolic resins (e.g. phenol-formaldehyde resins, oil-soluble phenolic resins, phenol-furfural resins, cresol-formaldehyde resins, resorcinol-formaldehyde resins, polyvinyl-hydroquinone resins, phenol-acetylene resins, bis-phenolic type epoxy resins), naphthalenic resins (e.g. dihydroxynaphthalene-formaldehyde resins), tannic resins (e.g. catechol tannin-formaldehyde resins), polyester resins (e.g. alkyd resins, unsaturated polyester resins, diallyl phthalate polymers, synthetic, rubber-like substances, terephthalic ester resins), styrene resins (e.g. polystyrene, styrene-divinylbenzene copolymers, styrene-acrylonitrile copolymers, styrene-dichlorostyrene copolymers, styrene-butadiene copolymers), acrylic resins (e.g. methyl acrylate polymers, methyl mataacrylate polymers, polyacrylonitriles, metacrylic acid-divinyl benzene copolymers, acrylonitrile-vinylchloride copolymers), other vinylic resins (e.g. vinylacetate polymers, vinylacetate-vinylchloride copolymers, polyvinylalcohol, polyvinylbutyral, polyvinylcarbazole), polyethylene, polyisobutylene, aromatic amine resins (e.g. aniline-formaldehyde resins, toluidine-formaldehyde resins, phenylenediamine-formaldehyde resins, hydrazine-formaldehyde resins), heterocyclic resins (e.g. furan resins, coumarone indene resins, 2-amino-4-methylthiazole-formaldehyde resins, 2-amino-4-methylthiazole-dicyandiamide-formaldehyde resins), polyamino acids (e.g. tyrosine-γ-methylglutamate copolymers, tyrosine-alanine copolymers, lysine-alanine copolymers, lysine-γ-methylglutamate copolymers, polytyrosine, polyphenylalanine, phenylalanine-γ-methylglutamate copolymers), commercial ion exchange resins; insoluble proteins, and amino derivatives of polysaccharides (e.g. dextran, Sephadex (trade name), cellulose derivatives).

When the polymer already contains primary amino groups as functional groups, it is not necessary, although it may be desirable, to introduce additional amino groups. For example, commercial basic anion exchange resins containing primarly amino groups (e.g. Amberlite IR-4B, IR-45, Wofatit N, Wofatit M, Duolite A-2, A-4, A-5, A-6, A-7, A-10, A-14, A-114, S-30, De-Acidite E, Dowex-3, p-aminobenzylcellulose, aminoethylcellulose, guanidoethylcellulose, aminoethyl sephadex, p-amino-p-aminobenzylsephadex, etc.) may be used as suitable polymers. On the other hand, a polymer containing no primary amino groups will require the introduction of such amoino groups. The amino groups can be introduced by any convenient method, e.g. substitution of halogen atoms of the polymer by amino groups, nitrosation and reduction and introduction of aminomethyl groups by chloromethylation and amination.

Sephadex is a hydrophilic, insoluble substance made by cross-linking the polysaccharide dextran. It consists of a three-dimensional network of polysaccharide chains and has a high content of hydroxyl groups. (Sephadex in gel filtration—Bulletin of the manufacturer—Pharmacia, Sweden—distributed to the trade prior to July 1966).

Amberlite IR-4B is a phenolic amine type anion exchange resin (Merck Index, 7th ed., p. 1584).

Amberlite IR-45 is a polystyrene amine type anion exchange resin (Merck Index, 7th ed., p 1584).

Wofatit N is a polystyrene weak base type anion exchange resin (Merck Index, 7th ed., p. 1584).

Wofatit M is a weakly basic anion exchange resin obtained by the condensation of m-phenylenediamine and polyethylene-imine with formaldehyde ("Ion Exchange Separations in Analytic Chem.," John Wiley & Sons, New York, 1963).

Duolite A-2, A-4, A-5, A-6, A-7, A-10 and S-30 are all anion exchange resins of the aliphatic or phenolic amine type, Duolite A-14 is an anion exchange resin of crosslinked polystyrene-aliphatic amine and Duolite A-114 is an anion exchange resin of polystyrene polyamine (Handbook of Chemistry and Physics, 41st ed. p. 1489, Chemical Rubber Publishing Co., Cleveland, Ohio; Ion Exchangers in Organic and Biochemistry p. 120, Interscience Publishers Inc., New York, 1957; Ion Exchange Separations in Analytical Chemistry, John Wiley & Sons, New York, 1963, pp. 31, 32; and Merck Index, 7th ed., p. 1579).

De-Acidite E is a weakly basic anion exchange resin (Merck Index, 7th ed., p 1583)..

Dowex 3 is an anion exchange resin of the polystyrene polyamine type (Merck Index, 7th ed., p. 1580).

The amino substitution of the polymer can be exemplified as follows:

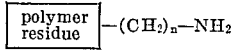

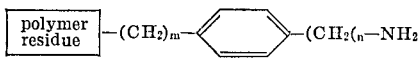

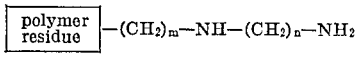

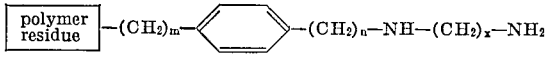

(where $m$, $n$ and $x$ are zero or integers). Alternatively, a functional group present in or as a side chain can be converted into an amino group, for example, by the conversion of a carboxylic group to nitrile and the subsequent reduction thereof to an aminomethyl group, the reduction of a nitrile to an aminomethyl or the reduction of a nitro group to an amino group.

A variety of techniques can be used from the preparation of the Schiff-bases according to the invention. For example, a solution of pyridoxal in water or in an organic solvent can be admixed with the high-molecular weight polymer, which may, if desired, be previously steeped in a suitable solvent. The pH of the solution is adjusted, if necessary, to a suitable value, either before or after the pyridoxal solution is admixed with the polymer, and the reaction is carried out at room temperature or at elevated temperature. After the reaction, the resulting Schiff-base composed of pyridoxal and the high molecular weight polymer can be separated by filtration and washed with water or an organic solvent similar to that used in the reaction, to yield a Schiff-base composed of pyridoxal and the high molecular weight polymer containing little or no impurity.

This reaction of pyridoxal and the polymer can be carried out in a homogeneous or a non-homogeneous medium. When the reaction is carried out in a homogeneous medium, the Schiff-base is precipitated after the reaction by addition of water. When a polymer having ion exchange properties is used, it is often preferred to combine the pyridoxal with the polymer not only as Schiff-base by chemical reaction but as a salt form by ion exchange. When the Schiff-base is used as an intermediate for further reaction, a side-reaction may occur owing to the presence of the thus-adsorbed pyridoxal as the salt form. In such a case, the adsorbed pyridoxal in salt form can be removed without hydrolysis of the Schiff-base by washing with a weakly acidic or weakly basic solution and then the Schiff-base containing no adsorbed pyridoxal in salt form can be obtained by washing with water.

A purified Schiff-base can be hydrolysed by treatment with acid or alkali solution to yield purified pyridoxal.

The reaction to produce the Schiff-base can be carried out using either a weakly acidic or a weakly basic solution of pyridoxal, a pH of 3–7 being most favorable. The reaction can usually be carried out advantageously at room temperature or elevated temperature.

SPECIFIC EMBODIMENTS

The present invention is illustrated by the following non-limitative examples:

Example I 100 g. of 98% styrene-2% divinylbenzene copolymer chloromethylated according to the method of J. Am. Chem. Soc., vol. 85, 2152 (1963) and the product was converted into an aminomethylated styrene-divinylbenzene copolymer by treatment with ammonia. The polymer was added to 500 ml. of water and allowed to swell thoroughly. The pH of the suspension was then adjusted to 5 with sodium acetate and separately, 1 g. of pyridoxine hydrochloride dissolved in 6 ml. of water was added; manganese dioxide (prepared from 0.9 g. of potassium permanganate and 1.1 g. of sodium sulphite) was added, and finally 1 g. of 50% sulphuric acid was added dropwise. The solution obtained, containing 0.81 g. of pyridoxal, was adjusted to pH 5.

The polymer suspension and the pyridoxal solution were mixed together and stirred at room temperature for 4 hours. The resin, which was yellow (the characteristic color of the Schiff-base of pyridoxal) was separated by filtration and washed several times with 0.01 N hydrochloric acid. Analysis of the washings for pyridoxal showed 0.11 g. and accordingly, the amount combined with the polymer was 0.70 g.

Example II 100 g. of poly (4-hydroxy-3-aminostyrene) (J. Chem. Soc., 2617 (1964)) was suspended in 500 ml. of water containing 0.81 g. of pyridoxal. The pyridoxal was prepared from 1 g. of pyridoxine hydrochloride in a manner similar to that as described in Example I. After stirring at a pH 5 at room temperature for 6 hours, the polymer, with which pyridoxal was combined in the form of a Schiff-base, was separated by filtration and washed several times with water. Analysis of the washings showed the pyridoxal content to be 0.04 g. and accordingly, the amount combined with the resin was therefore 0.77 g.

Example III 100 g. of Duolite A-7 (OH-form) resin was treated with 10 liters of a 0.1 N acetate buffer of pH 5. The resin was separated by filtration and washed with water. A pyridoxal solution having a pH of 5, prepared in a manner similar to that as described in Example I, was diluted with one liter of water, and then added to the resin. The mixture was stirred for 5 hours at room temperature. Afterwards, the resin was separated by filtration, and washed with water and with 0.01 N HCl. Analysis of the washings showed a pyridoxal content of 0.20 g. The amount of pyridoxal combined with the resin was therefore 0.61 g.

Example IV

An operation similar to that described in Example III, was repeated with the exception that 100 g. of Dowex-3 (OH-form) was used. Dowex-3 with which 0.45 g. of pyridoxal was combined was obtained in the form of a Schiff-base.

Example V

An operation similar to that described in Example II was repeated with the exception that 100 g. of p-aminobenzylcellulose was used. There was obtained yellowish N - pyridoxylidene-p-aminobenzylcellulose, in which 0.3 g. of pyridoxal was combined in the form of Schiff-base.

Example VI p-Nitrophenylalanine-N-carboxyanhydride and γ-methyl-DL-glutamate-N-carboxyanhydride (1:3) (prepared from DL-p-nitrophenylalanine and γ-methyl-DL-glutamate respectively) were copolymerized in tetrachloroethane with triethylamine as initiator, and the product was then reduced to a copolymer of DL-p-aminophenyl-alanine and γ-methyl-DL-glutamate. An operation similar to that described in Example III was repeated with the exception that 20 g. of the above described copolymer was used. A yellowish product, in which 0.78 g. of pyridoxal was combined in the form of Schiff-base was obtained.

We claim:

1. A substantially water-insoluble Schiff-base which is the reaction product of pyridoxal and a substantially water-insoluble high molecular weight polymer containing at least one primary amino group.

2. A Schiff-base according to claim 1 wherein the amino substituted polymer is selected from the group of polymers having the following representative structures:

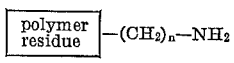

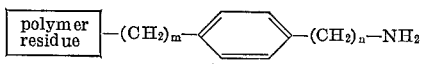

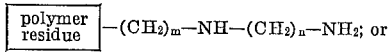

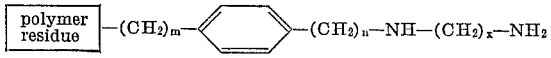

where $m$, $n$, and $x$ are zero or integers.

3. A substantially water-insoluble Schiff-base according to claim 1 wherein the high molecular weight polymer is an aminomethylated styrene-divinylbenzene copolymer.

4. A process for the preparation of a Schiff-base which comprises reacting pyridoxal in aqueous solution with a substantially water-insoluble high molecular weight polymer containing at least one primary amino group.

5. A process according to claim 4 wherein the pyridoxal solution reacted with the high molecular weight polymer has a pH of from about 3 to 7.

6. A process according to claim 4 wherein the high molecular weight polymer has ion exchange properties and wherein the pyridoxal is adsorbed on the polymer as a salt form by ion exchange and is combined as a Schiff-base.

7. A process as claimed in claim 6 wherein pyridoxal adsorbed on the resin is desorbed by washing with a weakly acidic or weakly basic solution to yield the Schiff-base free from adsorbed pyridoxal.

8. A process according to claim 4 wherein the high molecular weight polymer is an aminomethylated styrene-divinyl benzene copolymer.

9. A process according to claim 4 wherein the high molecular weight polymer is poly (4-hydroxy-3-aminostyrene).

10. A process according to claim 4 wherein the high molecular weight polymer is p-aminobenzylcellulose.

11. A process according to claim 4 wherein the purified Schiff-base obtained is hydrolyzed by treatment with an acid or alkyl to yield purified pyridoxal.

12. A Schiff-base according to claim 1 wherein the polymer component of the amino-substituted high molecular weight polymer is selected from the group consisting of a synthetic resin, a water-insoluble protein and a water-insoluble polysaccharide.

13. A Schiff-base according to claim 1 wherein the high molecular weight polymer containing at least one primary amino-group is an anion exchange resin containing at least one amino group.

14. The process accroding to claim 4 wherein the polymer component of the amino-substituted high molecular weight polymer is selected from the group consisting of a synthetic resin, a water-insoluble protein and a water-insoluble polysaccharide.

References Cited

UNITED STATES PATENTS 2,594,579   4/1952   Novotny et al. _____ 260—51

OTHER REFERENCES

Chem. Abst., 64:8154b, "Pyridoxal Schiff Bases," Murakami et al.

Chem. Abst., 64:17894e, "The Oxidation of Schiff Bases of Pyridoxal and Pyridoxal Phosphate etc.," Hill et al.

Pp. 485–90, Meltzler, "Equilibria Between Pyridoxal and Amino Acids and Their Imines," 1957.

Pp. 99–105, Christensen, "Three Schiff Base Types etc." 1958.

WILLIAM H. SHORT, Primary Examiner

E. WOODBERRY, Assistant Examiner

U.S. Cl. X.R.

260—6, 17.3, 72, 78, 112, 211, 212, 231